US007639986B2

(12) United States Patent
Vincent

(10) Patent No.: US 7,639,986 B2
(45) Date of Patent: Dec. 29, 2009

(54) METHOD AND SYSTEM FOR AUTOMATIC PLANNING OF TRANSMISSION TIME DELAYS OF TRANSMITTERS IN A TIME AND FREQUENCY SYNCHRONOUS BROADCASTING NETWORK

(75) Inventor: Francois Vincent, Clamart (FR)

(73) Assignee: Societe Francaise du Radiotelephone (FR)

(*) Notice: Subject to any disclaimer, the term of this patent is extended or adjusted under 35 U.S.C. 154(b) by 631 days.

(21) Appl. No.: 11/536,243

(22) Filed: Sep. 28, 2006

(65) Prior Publication Data

US 2007/0079337 A1 Apr. 5, 2007

(30) Foreign Application Priority Data

Sep. 30, 2005 (FR) .................................. 05 10009

(51) Int. Cl.
*H04B 1/00* (2006.01)
*H04B 15/00* (2006.01)

(52) U.S. Cl. ....................... 455/63.1; 455/296; 455/501

(58) Field of Classification Search .................. 455/47, 455/48, 101, 103, 104, 109, 180.1, 180.2, 455/203, 204, 437, 61, 295, 446, 423, 63.1, 455/500, 501, 278.1; 370/481, 208, 328, 370/335, 342

See application file for complete search history.

(56) References Cited

U.S. PATENT DOCUMENTS

| | | | | |
|---|---|---|---|---|
| 5,483,529 | A * | 1/1996 | Baggen et al. | 370/484 |
| 6,351,500 | B2 * | 2/2002 | Kumar | 375/270 |
| 7,539,126 | B2 * | 5/2009 | Geile et al. | 370/208 |

* cited by examiner

*Primary Examiner*—Sujatha Sharma

(57) ABSTRACT

The system for automatic planning of delays in a network (N) of SFN type comprises:

- means initiating an OFDM transmission for each radio transmitter (4), inter-symbol delays being provided;
- a calculation module processing network data and determining figures of populations located in zones with interference;
- control means and initiation means to delay transmission at each transmitter, with a delay varying between 0 and 1 ms;
- delay adjustment means linked to the control means for combinations of delays for all transmitters.

The module (11) recalculates the figures of populations located in interference zones for successive combinations of delays, and configuration means (13) of the system provide the number of permitted iterations. The optimal combination is obtained when said estimated population figures are minimum.

17 Claims, 4 Drawing Sheets

METHOD AND SYSTEM FOR AUTOMATIC PLANNING OF TRANSMISSION TIME DELAYS OF TRANSMITTERS IN A TIME AND FREQUENCY SYNCHRONOUS BROADCASTING NETWORK

CROSS-REFERENCE TO RELATED APPLICATIONS

This application claims priority from French Patent Application No. FR 05 10009, filed Sep. 30, 2005.

TECHNICAL AREA OF THE INVENTION

The present invention lies in the area of telecommunications and concerns the management of transmission time delays of transmitters in a wireless network, allowing the broadcasting for example of programs under the DVB-H standard (Digital Video Broadcast—Handheld) or other television broadcasting standards. The invention more particularly concerns a method and system for automatic planning of transmission time delays of the different transmitters forming a wireless broadcasting network that is time and frequency synchronous, enabling digital television broadcasting with a single UHF frequency (Ultra High Frequency) towards radio mobile terminals over a large territory.

The invention applies to the area of transmissions based on OFDM (Orthogonal Frequency Duplex Modulation). OFDM is a digital signal modulation method which is used inter alia for high data rate mobile transmission systems. OFDM is particularly suited to wireless transmission channels with multiple wave transmission (echos) due to reflections of the waves on obstacles. When the multiple transmissions combine they modify and even destroy the transmitted signal causing the same signal to be received several times with time shifts.

TECHNOLOGICAL BACKGROUND OF THE INVENTION

Digital transmission technologies such as Digital Video Broadcasting—Terrestrial (DVB-T) for Europe, and Integrated Services Digital Broadcasting—Terrestrial for Japan, have brought TV broadcasting into the digital age. In parallel, the development of the Internet network, and especially the generalization of broadband access offer the technical possibility of broadcasting audio and video services on this network towards terminals. The emerging DVB-H standard corresponds to an additional step with respect to the DVB-T standard, making it possible for mobile terminals to receive digital wireless broadcasting.

The planning of DVB-H networks, as early as the design stage, requires giving consideration to characteristics of conditions of use particular to TV reception by a portable, mobile receiver. Like mobile telephony, consideration must be given to the fact that such uses are chiefly made inside buildings and when on the move.

Within a network, the electric radio signals received by a receiver are often made up of several instances of the transmitted signal. This is the case in particular when the close environment of the transmitter or receiver contains obstacles and when multiple paths are needed (e.g. communication with a cell-type mobile). It is also the case when the same signal is broadcast from several transmission points (paging network in a digital paging system of ERMES type, digital broadcasting networks, or transmission diversity . . . ). As a result, technical devices must be developed to take these phenomena into account.

OFDM technology is largely deployed in multi-frequency networks on account of the desired high bit-rates in digital wireless broadcasting technologies: this is case with DVB for its terrestrial components (DVB-T) and mobile components (DVB-H), and with DAB (Digital Audio Broadcasting) and DMB technologies (Digital Multimédia Broadcasting). Since the various receiver devices are limited by their sensitivity in receiving the different effective components of the signal in a given same integration time, it is advisable to use OFDM modulation. This modulation, between each symbol, provides for a non-data carrying delay allowing integration on reception of all the signals received, provided there are no excessively delayed signals. It will be understood therefore that with OFDM technology some areas offer insufficient communication quality due to interference resulting from late reception of signals transmitted via "delayed" paths.

In the "young" prior art, tools are known for managing broadcasting transmitters requiring case-by-case adjustment. These tools sometimes enable visualization of maps of interference generated by differences in propagation time, and thereby provide information which can be used to <<manually>> adjust delays to eliminate interference.

At the current time there does not exist any satisfactory solution for managing delays which cause interference in a television broadcasting radio network, and it is difficult for an operator to ensure acceptable quality of service with existing tools.

GENERAL DESCRIPTION OF THE INVENTION

The object of the present invention is therefore to overcome one or more disadvantages of the prior art by defining a method for planning transmission time delays of the different transmitters forming a wireless broadcasting network that is time and frequency synchronous, which can facilitate obtaining optimal reception quality at the different points of the network.

A further object of the invention is to enable the obtaining of an optimised digital television broadcasting network using a single frequency whilst ensuring dense coverage of an extensive territory with minimum interference.

A further object of the invention is pragmatically to take into account the particularities of the coverage zones of each transmitter (land characteristics) to ensure suitable service quality for subscribers within the entire coverage area.

For this purpose, the invention concerns a method for automatically planning transmission time delays of different radio transmitters generating radio cells with one same frequency, to form a digital television broadcasting radio network that is time and frequency synchronous, implemented via a computing system comprising memorization means to store network-related data including data representing geographical areas divided into a plurality of dots or pixels in accordance with the divisions of said network and containing the position of the radio transmitters, population data corresponding to the divisions of the network, data specifying a transmission level of the transmitters and a sensitivity threshold level of radio reception by terminals in the cell, data representing a radio propagation attenuation law and data representing guard intervals inserted between data frames, the system also comprising a calculation module and means for parametering a plurality of radio transmitters, the method comprising for each radio transmitter a transmission initiation step at a given instant, characterized in that it comprises a processing step to process network-related data, using the calculation module to calculate data representing figures of populations located in areas of disturbing interference, and an adjustment step to adjust said initiation step made for each radio transmitter using a transmission delay varying between 0 and a non-zero value less than 1 ms with memorization for each radio transmitter of the delay used, the adjustment step being followed by a reiteration of the processing step to re-estimate figures of populations located in areas of disturbing interference, the processing step being reiterated with a number of iterations parametered using the configuration means of the system, the adjustment step being finalized after the iterations with a memorized combination of delays used for each transmitter in the set of transmitters with which it is possible to reach a minimum figure for said estimated population figures in areas of disturbing interference.

With the invention, the automatic planning is therefore possible of transmission delays in a network having a topology of SFN type (Single Frequency Network), allowing the management of complex networks of several thousand <<isofrequency>> sites which in practice would be fully impossible to manage manually.

According to another characteristic, the processing step of network-related data comprises:

a determination step to determine a radio coverage of the network, including processing by the calculation module of geographical map data containing the position of the radio transmitters, data specifying a transmission level of the transmitters and a sensitivity threshold level of wireless reception by terminals in the cell, and data representing a radio propagation attenuation law, to generate data representing coverage maps of the network which for each of the transmitters specify field levels of received signals in each of the pixels;

for each radio transmitter, an estimation step to estimate an effective signal and an interference signal in pixels of the network, by means of a breakdown, made by the calculation module, of field levels of signals received via the network into an effective component and an interfering component, the calculation module using a weighting function which can be parametered to perform said breakdown.

According to another particularity, the processing step of network-related data, for each radio transmitter, comprises:

a calculation step to calculate an interference probability for each pixel, in which a value representing the signal to disturbance ratio is first calculated by the calculation module for each pixel on the basis of estimated signals associated with respective pixels, said disturbance consisting of intercellular interferences and noise related to the width of the channel used by the cell transmitters, then the probability of interference in the pixel is deduced from the calculations of said ratio in the pixels by the calculation module; and a determination step to determine a criterion representing the total population located in areas of disturbing interference, said criterion being determined by the calculation module on the basis of interference probabilities in each pixel and population data corresponding to the divisions of the network.

According to another particularity, the adjustment step to adjust said initiation step is made in a manner determined by the calculation module to reach a minimum sum of said criteria as calculated by integration on all transmitters, said minimum resulting in particular from at least one comparison made by comparison means in the calculation module between several separate solutions for adjusting transmission delays within the network.

According to another particularity, the probability of interference in each pixel is deduced from the calculations of said ratio in the cell pixels by comparison means of the calculation module, a minimum ratio value being stored in the memorization means and used by the comparison means to determine for each pixel whether the minimum ratio is reached and thereby to obtain the interference probability for the pixel.

According to another particularity, the adjustment step uses values distributed in a pitch of between 1 μs and 45 μs over a range of values whose amplitude remains less than 500 μs.

According to another particularity, the adjustment step uses values distributed in a pitch of between 5 μs and 45 μs over a range of values whose amplitude remains less than 500 μs.

According to another particularity, the step initiating transmission at a determined instant comprises the splitting of a signal received by the transmitter into a plurality of transmission signals on a plurality of sub-carriers according to digital frequency modulation of OFDM type, guard intervals of the same determined transmission duration being inserted between data frames forming OFDM-modulated symbols, the transmission period of the guard intervals being a constant function of the transmission period of a symbol.

According to another particularity, the inventive method comprises a memorization step to memorize data on user traffic density in a mobile telephony network to be used instead of population data.

According to another particularity, the step determining radio coverage comprises a determination step by the calculation module, for each pixel, of a respective distance between each transmitter and the pixel to be considered, followed by a correction step by the calculation module to correct this distance taking into account the parametered delay for the respective transmitters using the delay adjustment means.

A further object of the invention is to propose a system adapted to parameter a television broadcasting network over an extensive territory, using a single frequency whilst ensuring dense coverage of an extensive territory, with minimum interference for the user.

For this purpose, the invention concerns a system for automatic planning of transmission time delays of different radio transmitters generating radio cells with one same frequency to form a time and frequency synchronous digital television broadcasting wireless network, comprising memorization means to store network-related data including data representing geographical areas divided into a plurality of dots or pixels according to the divisions of said network and containing the position of the radio transmitters, population data corresponding to the divisions of the network, data specifying a transmission level of transmitters and a sensitivity threshold level of wireless reception by cell terminals, data representing a radio propagation attenuation law, and data representing the duration of guard intervals inserted between data frames, the system also comprising a calculation module and means for parametering a plurality of radio transmitters, characterized in that it comprises means for initiating transmission at a determined instant for each radio transmitter, the calculation module being arranged to calculate, by processing network-related data, data representing figures of populations located in areas of disturbance interference, said parametering means being able to use delays stored in the memorization means, means for controlling the initiation means being provided to delay transmission at each radio transmitter, with a delay varying between 0 and a non-zero value less than 1 ms, this delay being memorized for each radio transmitter, means for adjusting delays being connected to the control means to supply different combinations of delays for all the transmitters, the calculation module being provided with iterating means allowing further calculation of the populations located in areas of disturbing interference with separate delay combinations, means for configuring the system being linked to the calculation module to provide a number of iterations enabling deactivation of the iteration means, said control means being able to use, from among the combinations supplied by the delay adjusting means, a combination of delays for all the transmitters which corresponds to the obtaining of a minimum figure of said estimated population figures by the calculation module.

According to another particularity the calculation module, to calculate data representing figures of populations located in areas of disturbing interference, contains:

means for determining wireless coverage of the network, able to process geographical map data containing the position of the radio transmitters, the data specifying a transmission level of the transmitters and a sensitivity threshold level of wireless reception by terminals in the cells, and data representing a radio propagation attenuation law, to generate data representing network coverage maps which, for each of the radio transmitters, specify field levels of signals received in each of the pixels;

estimation means to estimate for each radio transmitter an effective signal and an interference signal in pixels of the network, these estimation means being able to break down field levels of signals received via the network into an effective component and an interfering component, and to use a weighting function parametered by the configuration means to make said breakdown;

determination means, for each radio transmitter, of an interference probability for each pixel, arranged to calculate a value representing the signal to disturbance ratio for each pixel on the basis of the estimated signals associated with the respective pixels provided by the estimation means, said disturbance consisting of intercellular interference and noise related to the width of the channel used by the cell transmitters, said determination means calculating the interference probability in the pixel using the calculations of said ratio in the pixels;

association means allowing, for each transmitter, the determination of a criterion representing the total population located in areas of disturbing interference, said criterion being determined by association of the interference probability in each pixel and population data corresponding to the divisions of the network.

According to another particularity, the calculation module determines the combination of delays to be used by the control means using comparison means of the calculation module which, from among a plurality of sums of criteria respectively corresponding to the different delay combinations, determine a minimum sum of said criteria calculated by integration on all transmitters.

According to another particularity, the interference probability in each pixel is deduced from the calculations of said ratio in the cell pixels by the comparison means of the calculation module, a minimum ratio value being stored in the memorization means and used by the comparison means to determine for each pixel whether the minimum ratio is reached and thereby enable obtaining of the interference probability for the pixel.

A further object of the invention is to propose a network adapted so as to allow television broadcasting over an extensive territory, ensuring continuous coverage which takes into account actual land conditions and minimizes the risk of interference for the user.

For this purpose, the invention concerns a network for the broadcasting of wireless communications containing at least one TV or radio program, characterized in that it consists of a mobile telephony network comprising a plurality of transmitter sites forming respective radio cells, together defining radio coverage, and in that all these sites are equipped with transmitters for TV or radio broadcasting and in that they are all parametered with one same UHF frequency to generate a radio cell, the transmitters being arranged to send frames forming an OFDM-modulated symbol with a guard interval corresponding to a fraction of between one quarter and one sixteenth of the transmission time of a frame, the transmitters being arranged to initiate their respective transmission with a determined shift or delay varying between 0 and a non-zero value less than 1 ms and not exceeding twice the guard interval period, said network using a combination of delays adapted to minimize the number of areas of disturbing interference coinciding with populated areas.

The invention, with its characteristics and advantages will become more clearly apparent on reading the description which refers to the appended drawings given as non-restrictive examples in which:

FIG. 1 schematically shows the computing system of the invention and part of the network;

Figure 6:
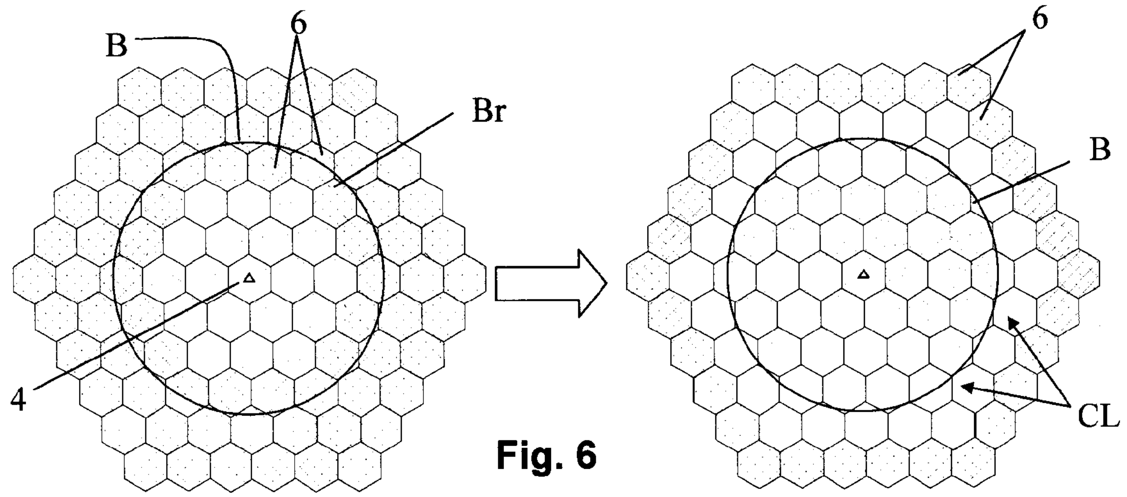
Figure 7:
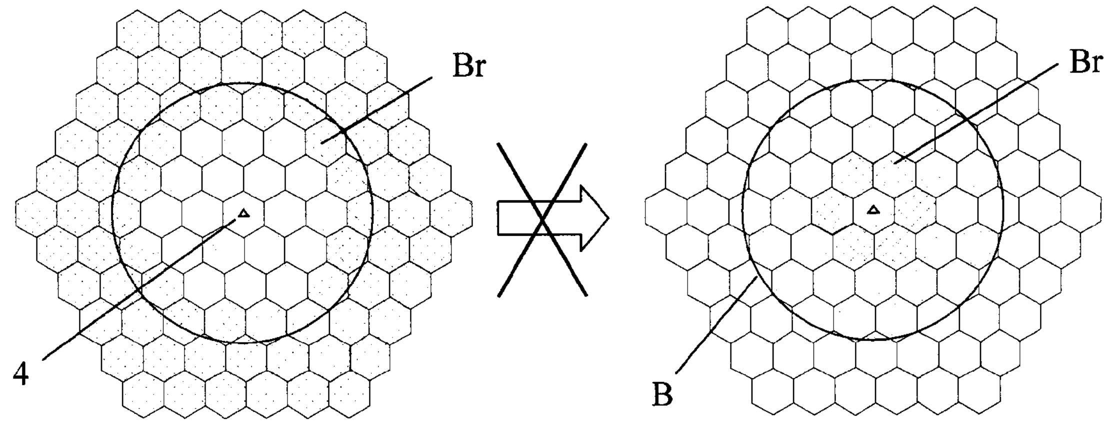
Figure 8:
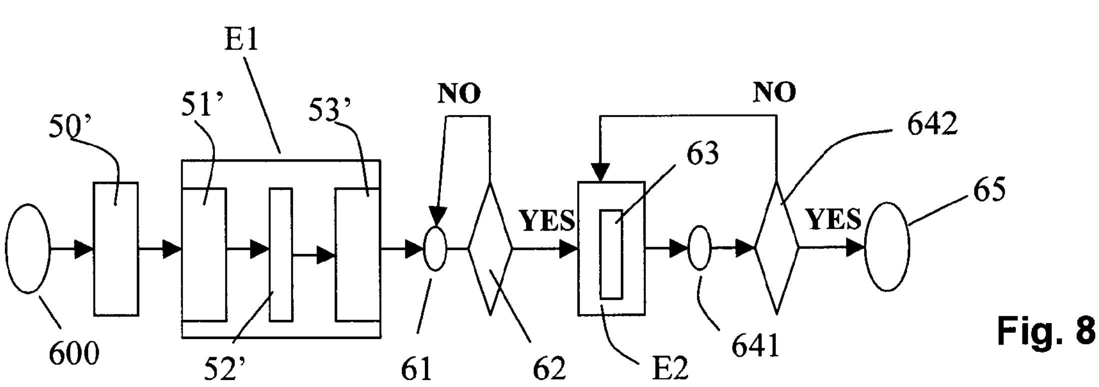

FIG. 6, showing digital maps used in accordance with the inventive method for planning delays, illustrates a possibility for improving quality in part of the network;

FIG. 7, with the digital maps used according to the inventive method, illustrates the influence of a transmission shift that is too large for a transmitter of the network;

FIG. 8 is a logic diagram of the steps of the invention according to one embodiment of the invention.

DESCRIPTION OF PREFERRED EMBODIMENTS OF THE INVENTION

In OFDM (Orthogonal Frequency Duplex Modulation), the signal is multiplexed over a large number of sub-carriers, so that the bit rate is reduced on each of the sub-carriers. Therefore symbol duration is increased and the risk of intersymbol interference can be reduced. It is recalled here that a given symbol (S) conveys a certain number of data bits.

Through rigorous regular spacing between carriers, the latter form what mathematicians call an orthogonality relation. The spacing in frequency $f_u$ is the inverse of the effective period $T_u$ (or active period) of the symbol during which the receiver integrates the demodulated signal. In addition to multiplexing data on different low bitrate sub-carriers, OFDM provides a non-data carrying delay between each symbol enabling integration of all received signals on reception. The addition of this delay called guard interval (GI, FIG. 2) between the successive symbols makes it possible to preserve the criterion of orthogonality for delayed paths.

These properties of OFDM which allow natural adaptation to the propagation multi-paths particular to urban environments and/or communications with mobiles, are advantageously used in the method of the invention to enable the broadcasting of one same information from several different transmitters, and all at the same frequency. The method can be used to define wireless coverage allowing broadcasting of DVB type with a single UHF frequency via a network provided with a plurality of base station transmission means allowing the generation of radio cells, and without any limitation as to the surface area to be covered. The invention sets out to establish DVB coverage, e.g. DVB-H, or any other similar digital television broadcasting on a SFN network. Evidently, all the transmitters 4 are precisely frequency synchronized and are time synchronized, i.e. they transmit data at the same instant. The broadcast contents are also strictly identical.

The inventive method provides for initiating a transmission at a determined instant by dividing the signal received by the transmitter 4 into a plurality of transmission signals on a plurality of sub-carriers in accordance with digital frequency modulation of OFDM type. These signals will be sent simultaneously by this transmitter 4. Guard intervals GI having one same determined transmission period are inserted between the data frames forming the OFDM-modulated symbols S, and the transmission period of these guard intervals GI is fixed as being a constant function of the transmission of a symbol S.

With the invention, it is therefore possible to design a network for the broadcasting of wireless communications, containing at least one TV program. The network architecture is of mobile telephony type and, by means of the transmitter sites, allows the defining of continuous wireless coverage over a vast territory. All the transmitter sites are parametered with the same UHF frequency and are arranged to send the frames with a guard interval GI corresponding for example to a fraction of between one quarter and one eighth, even one sixteenth of the transmission time of a frame.

Figure 2:
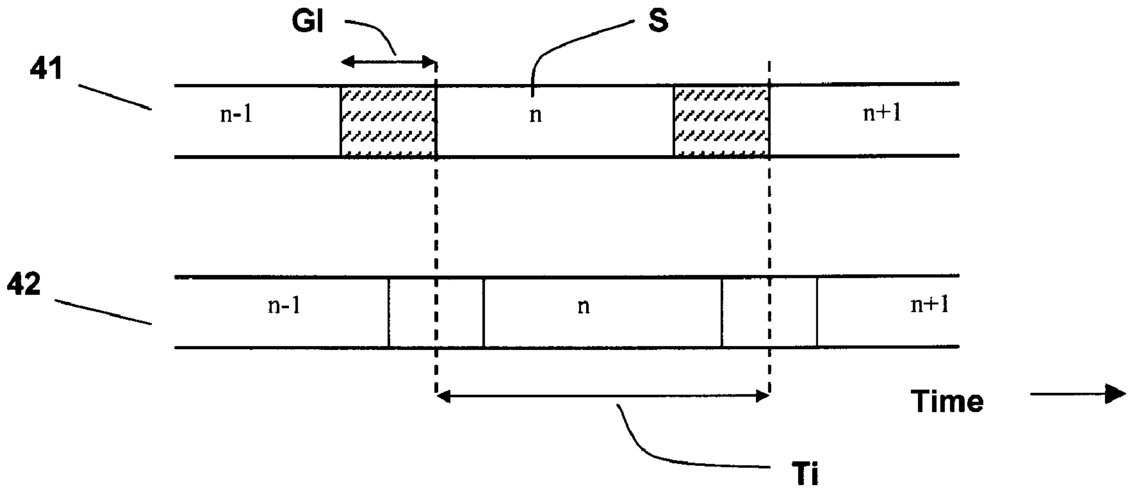
FIG. 2 illustrates the adding of the guard interval between successive symbols.

With reference to FIG. 2, whereas a main path 41 does not raise any problem of interference, it appears that for a delayed path 42 the symbol period must be lengthened using the guard interval GI to prevent the integration period Ti from covering two symbols. For as long as some signal components are received with a delay within the guard interval, there is no interference with the following symbol S. On the other hand, as soon as one of the components oversteps this delay, it creates interferences on the following symbol. Said problem can be solved by increasing the duration of the guard interval GI. In one embodiment of the invention, the non-signal carrying period corresponding to the guard intervals GI does not exceed one quarter of the transmission time of a frame forming an OFDM-modulated symbol. Therefore the available bandwidth is not too reduced. This duration of the guard interval GI is then the same for all the transmitters 4 broadcasting one same signal on one same frequency.

The inventive method sets out to take into account the duration of the guard interval GI so that it is possible to reduce interference problems. In particular, the object of the method is, for each radio transmitter 4, to automatically make adjustments or shifts in transmission initiation permitting "the absorption" of disturbing late-received signals whilst making it possible to minimize the total number of transmitters 4. In other words, the signals provided simultaneously to the transmitters 4 of the network N will optionally be transmitted with delays or in advance (in the order of 0 to 500 μs for example) with respect to a reference instant for transmission synchronization. The adjustment of relative transmission instants of the different transmission sources must be made optimally to reduce as much as possible the interference areas coinciding with populated areas or areas with heavy user traffic in a mobile telephony network (e.g. roadways or railways where users frequently use their mobile telephone to receive contents broadcast via the network).

Figure 3:
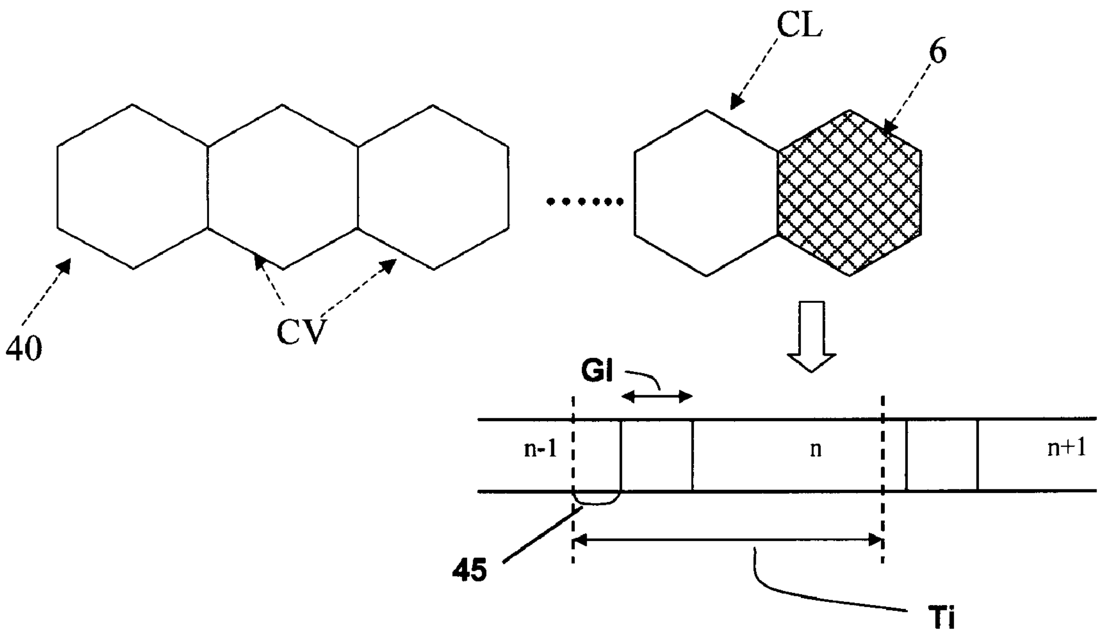
FIG. 3 shows the correspondence between cell distances and the generation of destructive interference, taking into account the chosen guard interval.

As illustrated in FIG. 3, for the cells 6 of the closest ring to be interfered, the relative delay 45 is less than one symbol period: only part of the signal transmitted on this path acts as interference, since it only conveys data belonging to the preceding symbol. It is true that the remainder conveys data of the effective symbol but can be added constructively or destructively to the data of the main path.

Figure 1:
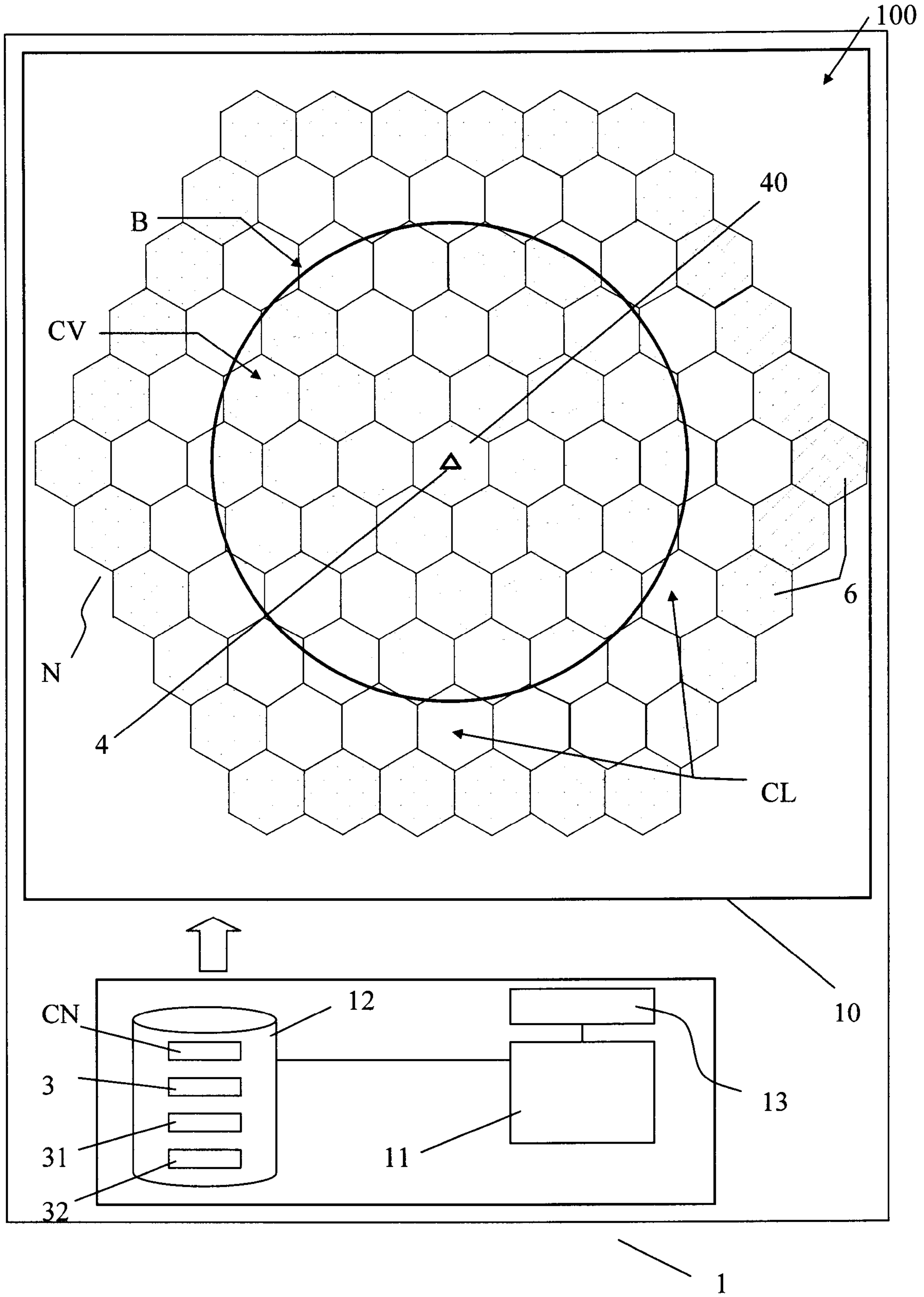

FIG. 1, on a display device 10 of a computing system 1, shows a map 100 of a geographical area of a network N of digital television broadcasting in the progress of being defined or optimized, on which the planned positions of radio cells (CV, CL, 6) have been added surrounding the cell 40 generated by the transmitter 4 whose position is indicated. It will be understood here that the terminology <<transmitter>> must be taken in its broadest meaning of one or more wireless transmission equipments allowing the generation of a radio cell. As shown, the neighbouring cells CV close to cell 40 under consideration are located in an interference area B in which the most delayed signals transmitted by indicated transmitter 4 are received during the guard interval GI. For this embodiment in FIG. 1 which corresponds to proper functioning of the network N at a single frequency, the cells CL of the first ring located beyond the interference area B nevertheless allow receiving of the signals sent by the transmitter 4 during the guard interval. The most distant cells 6 which do not allow reception of the signals during the guard interval GI do not cause any interference problem since they are located outside the interference area B of the transmitter 4.

The map (100) represents data of a digital map CN stored in memorization means 12 of the computing system 1, such as a database. The calculation processing means, or central unit, memorization means, entry means and data presentation means, by keyboard and/or interactive display screen with mouse or other, are not shown in detail in the computing system 1. The digital map CN specifies natural and artificial reliefs and their type such as forest, buildings or other, so that it is possible to calculate an estimate of radio attenuation of links affected by these reliefs.

With reference to FIG. 1, the transmitter 4 to be adjusted produces an interference area B which extends over several neighbouring cells CV. The cells are shown here in a hexagonal model. For a network N of SFN type using a guard interval GI, proper functioning is encountered when the area consisting of cells CL receiving signals delayed in the guard interval GI extends beyond the interference area B of transmitter 4. On the other hand, as illustrated on the left in FIGS. 6 and 7, the network N produces interferences when the interference area B extends beyond the group of cells CL for which correction by the guard interval GI is still possible. Zones Br with disturbing interference therefore exist in which a user will not be able to receive signals sent by transmitter 4 under consideration with sufficient quality.

The inventive method acts to adjust the relative transmission instants of the different transmitters 4 so as to minimize self-interference, illustrated FIGS. 6 and 7, of network N of SFN type. With respect to a reference instant, it will be understood that the transmission of transmitter 4 to be adjusted can advantageously be advanced so that the signals received in the interference area B arrive at the receivers no later than during the guard interval GI. For said adjustment, the effective transmission initially planned can therefore be moved forward for some transmitters 4 while the other transmitters will necessarily have delays with respect to this advanced transmission instant (as compared with initial planning). In other words, the transmitters 4 which synchronously receive the data to be transmitted through the network N will mostly have relative transmission shifts between them.

FIG. 7 illustrates the fact that the advance with respect to the reference instant initially planned must be limited so as not to create proximity interference. The zones Br of disturbing interference shown FIG. 7 therefore show that the shift can only be parametered within a limited margin. Therefore with the inventive method, a network N can be set up for the broadcasting of wireless communications including at least one TV or radio program, in which the transmitters 4 are arranged to initiate their respective transmission with a determined delay or shift which does not exceed twice the period of the guard interval GI. This delay varies for example between 0 and a non-zero value less than 1 ms. The delays are therefore very limited so that the network N remains synchronous and it is impossible for users to perceive the shifts. The network N then uses a combination of delays adapted so as to minimize the number of zones Br with disturbing interference coinciding with populated areas.

In one embodiment of the invention the method for automatic planning of delays is implemented via a computing system 1 such as shown FIG. 1. This system 1 comprises memorization means 12 for example with which to store data related to the network N, including:

data 3 representing geographical areas divided into a plurality of dots or pixels 301, 302, 303 in accordance with the divisions of said network N and containing the position of radio transmitters 4;

population data corresponding to the divisions of the network, data 31 specifying a transmission level of transmitters and a sensitivity threshold level of radio reception by terminals of the cell 1;

data 32 representing a radio propagation attenuation law; and data representing a time period of guard intervals GI inserted between data frames.

The system 1 comprises means for parametering a plurality of radio transmitters 4 and a calculation module 11 to process data related to the network N to calculate figures of populations located in the zones of disturbing interference Br. With reference to FIG. 1, the system 1 comprises means (not shown) for initiating a transmission at a determined instant for each radio transmitter 4. Means for controlling the initiation means are provided to delay transmission at each radio transmitter 4. Means for adjusting delays are linked for example with these control means to provide different combinations of delays for all transmitters 4. The means for parametering the radio transmitters, grouping together for example the means for controlling the transmission initiation means and the means for adjusting delays, make it possible to use the delays which are stored in the memorization means 12.

The calculation module (11) also has iteration means with which it is possible to recalculate the figures of populations located in zones Br of disturbing interference using separate delay combinations. As illustrated FIG. 1, the system 1 comprises configuration means 13 linked to the calculation module 11 to provide a number of iterations enabling deactivation of the iteration means. In other words, the iterated calculation operations to converge towards an optimal solution are stopped as soon as the number of iterations parametered by the user with the configuration means 13 is reached.

In one embodiment of the invention, the control means may, from among the combinations provided by the delay adjustment means, use a combination of delays for all transmitters 4 which offers the greatest quality of service from a user's viewpoint. This combination therefore corresponds to the obtaining by the calculation module 11 of a minimum estimated figure of populations located in zones Br of disturbing interference. In one variant of embodiment, the population data may be replaced by data on the density of user-subscriber traffic (users of a mobile telephony network). This traffic density data is then stored in the memorization means 12 and the estimates made by the calculation module will represent ill-served traffic on account of disturbing interference. It will be understood therefore that population data can be replaced according to the invention by other data relating to density of service use.

In one preferred embodiment of the invention, the calculation module 11 has means for determining the radio coverage of the network N, enabling processing of data 3, 4, 31, 32 related to the network N stored in the memorization means 12, to generate data representing coverage maps CN of the network N. This data, for each of transmitters 4, specifies field levels of signals received in each of the pixels 301, 302, 303. The computing system 1 can therefore be used to deploy transmitters 4 and show them on the display device 10. The operator is therefore able to visualize all or part of the network N to be planned.

The coverage zone of each transmitter is calculated using a prediction model for example, implementing the radio propagation attenuation law, which is associated with appropriate altimetry and land morphology databases. With this prediction model, it is possible to characterize the local specificities of the network N, by means of the division into pixels 301, 302, 303. The reception level at each transmitter 4 can therefore be calculated in each pixel of the studied area on the map 100. Matrices associated with each of the radio cells may also be calculated to represent these reception levels at the cells. The coverage of each transmitter 4 thus calculated is memorized in the memorization means to form said data representing the coverage maps CN of the network N.

The computing system 1 can then, on the basis of the respective coverage areas obtained, estimate the signal received by each of the transmitters 4. To do so, the calculation module 11, for each transmitter 4, determines a distance between the transmitter 4 and the pixel 301, 302, 303 to be taken into consideration, then corrects this distance by the possible parametered delay for this transmitter 4 using the delay adjustment means. In other words, for a given pixel 301, the signals received in this pixel 301 are estimated with their components over time, the power of each of these signals also being determined as illustrated FIG. 5. Components (C1, C2, . . . Ci, . . . , Cn) of the received signals derived from the different transmitters 4 are used to estimate qualitatively the functioning of the network N.

Each component can be obtained using an attenuation function A(R) in relation to the distance R from the transmitter, according to the following formula:

$$C=P-A(R)$$

where P is the transmitted power and the function A(R) is a propagation law appropriate to the working technology and environment, e.g. the known COST 231 model giving the resulting field at a certain distance R from the transmitter 4.

The calculation module 11 comprises estimation means determining, for each radio transmitter 4, an effective signal and an interference signal. In one embodiment of the invention, the respective signals are estimated in pixels 301, 302, 303 of the network N. These estimation means are used for example to break down field levels of received signals into an effective component and an interfering component. A weighting function parametered using configuration means 13 is used to make this breakdown. Each of the components Ci identified during the preceding phase by the calculation module 11 can be broken down into an effective part CiWi and an interfering part Ci(1−Wi). The weight distribution of the effective and interfering components is dependent upon the technology used. The weight is chosen for example to correspond to technologies of the type DVB-H, DVB-T, DAB (Digital Audio Broadcasting), the technology of Korean origin DMB (Digital Multimedia Broadcasting), FLO or any other technology based on OFDM.

In one embodiment of the invention, the parametering means of the system allow specific parametering of these weight functions or the use of pre-programmed functions for T-DAB, DVB-T and DVB-H technologies. These functions are described in the reference document "Impact on coverage of intersymbol interference and FFT window positioning" by Roland Brugger and David Hemingway: EBU Technical Review July 2003.

The calculation module 11 has means for determining, for each radio transmitter 4, an interference probability P1, P2, P3 assigned to each pixel 301, 302, 303. With these determining means it is possible to calculate a value representing the signal to disturbance ratio C/(I+N) for each pixel 301, 302, 303 on the basis of estimated signals associated with the respective pixels provided by the estimation means. Said disturbance consists of intercellular interference I and noise N related to the width of the channel used by the cell transmitters 4. For a given transmitter 4, the probability of interference P1, P2, P3 in the pixel 301, 302, 303 is calculated by said determination means on the basis of calculations of the ratio C/(I+N) obtained in the respective pixels 301, 302, 303. It will be understood that the respective probabilities of interference P1, P2, P3 in each pixel 301, 302, 303 are easily deduced from the respective calculations of said ratio in the cell pixels. For this purpose, comparison means of the calculation module 11 use a minimum ratio value stored in the memorization means 12 in order to determine for each pixel 301, 302, 303 whether this minimum ratio is reached. In this way, the comparison means allow the obtaining of interference probabilities P1, P2, P3 for a given pixel 301, 302, 303.

In known manner, the minimum value of the ratio C/(I+N) to obtain proper functioning depends on the technology used and the choices of modulation and coding in this technology:

$$\frac{C}{I+N} = f(\text{technology, modulation, coding})$$

Also in known manner, the signal to interference ratio on the edge of coverage by a transmitter 4 is a function of the radius Rc of the cell covered by a transmitter 4 and of the distance D equivalent to the propagation time of the inter-symbol delay forming the guard interval GI:

$$\frac{C}{I} = \text{interference}\ (Rc,\ D)$$

Similarly, it is known that the signal to noise ratio is a function of the coverage radius of the cell Rc:

$$\frac{C}{N} = \text{attenuation}\ (Rc)$$

To obtain the service at a given dot or pixel 301, 302, 303, the ratio C/(I+N) must be greater that the minimum reference value tolerated by the technology, i.e.:

$$\frac{C_{real}}{N + I_{real}} \geq \frac{C_{ref}}{N + I_{ref}}$$

in which:

$$I_{real} = C_{real}/\text{interference}(Rc,D)$$

where interference (Rc, D) is:

$$\frac{\max\left\{\begin{matrix}\sum_{\text{interfering\_cell}} prob(\text{attenuation}\ (D);\ 50\%); \\ \sum_{\text{3\_strongest\_interferer}} prob(\text{attenuation}\ (D);\ 10\%)\end{matrix}\right\}}{prob(\text{attenuation}\ (Rc);\ \text{prob\_service})}$$

The function prob(value1; value2) is a function giving the field level reached with a probability greater than value2 for a mean value equal to value1. The value prob_service is parametered by the user in relation to the desired quality of service for the considered technology.

With reference to FIG. 1, the system of the invention 1 allows calculation of data representing figures of populations located in zones Br of disturbing interference, using association means which, for each transmitter 4, determine a criterion representing the total population located in zones Br of disturbing interference. This criterion is determined by association of the interference probability P1, P2, P3 in each pixel 301, 302, 303 with the population data corresponding to the divisions of the network N. The fact of applying the interference probability of pixel 301, 302, 303 to the population living in this pixel makes it possible to calculate the population with interference on this pixel 301, 302, 303. It will be understood that the total population with interference is then the sum on the effective surface area corresponding to coverage by network N of the interference population on each pixel 301, 302, 303.

The calculation module 11 determines the combination of delays to be used by the control means via comparison means of the calculation module 11, to determine a minimum sum from amongst a plurality of sums of criteria calculated by integration on all transmitters 4 and respectively corresponding to the different combinations of delays. In other words, the adjustment of the relative transmission instants of the different transmitters 4 is made by the calculation module 11 specifically so as to reach a minimum criteria sum. The comparison means of the calculation module 11 allow the determination of this minimum by performing comparisons between several separate solutions for transmission delay adjustment within the network N. Each sum corresponding to one of the solutions is memorized for example in the memorization means 12 of the system 1.

Throughout the variations in transmission delay made by the delay adjustment means, within the upper and lower limits of time shift parametered by the user (with respect to an initial reference instant), the calculation module 11 stores data representing the quality of delay combinations. In one preferred embodiment of the invention, the optimisation of delays is made in particular by using an optimisation algorithm of simulated "annealing" type by the calculation module 11. This algorithm is stored in a working memory of the calculation module 11, a database or any other storage means linked to the calculation module 11. A convergence function provided with this algorithm is for example in the form:

$$\text{Cost}([t]) = \sum_{Tx_i} \sum_{Tx_j \neq Tx_i} \text{constraints}(Txi, Txj, ti - tj)$$

where [t] is a combination [t] of delays respectively applied to each transmission Txi, and Σ constraints (Txi, Txj, ti−tj) is the population interfered by transmission Txi $Tx_j \neq Tx_i$ when the transmitter indexed $Tx_j$ is delayed by ti−tj with respect to the transmitter indexed $Tx_i$.

The cost function used, for a set of transmission delays [t] of the different transmitters 4, therefore consists of the sum of interfered populations for each pair of cells taking into account the difference of their respective transmission delays. Two parameters such as an acceptance threshold Xa and a number of iterations Xi may be fixed by the user so that said optimisation is made until the variation of the convergence function or criterion Cost([t]) over Xi iterations brings it to a level below the threshold Xa. Alternatively, no threshold may be provided and the combination [t] of delays chosen is the one which allows obtaining of the minimum sum from among the calculated sums. The convergence is stopped as soon as the number Xi of iterations parametered by the user is reached. Evidently, the algorithm of simulated "annealing" type can be replaced by a "taboo" list method or any other derived iterative convergence method.

This method of obtaining a combination [t] of delays to be applied has the advantage of a short calculation time. For even more certain optimisation of the network N, the system 1 provides for example for use of the near-optimal solution obtained in the above-mentioned manner and on the basis of this first solution to calculate interference maps for all possible modifications of the delay of a single transmitter. This first optimal solution can be implemented without requiring a new calculation of figures of populations located in zones Br of disturbing interference. The adjustment of delays can be reiterated under the control of the iteration means, directly after the calculation of the convergence function. The number of iterations associated with the loop "adjustment of delays-calculation of convergence" can therefore be parametered and a near-optimal solution for the combination of delays can be memorized.

Figure 4:
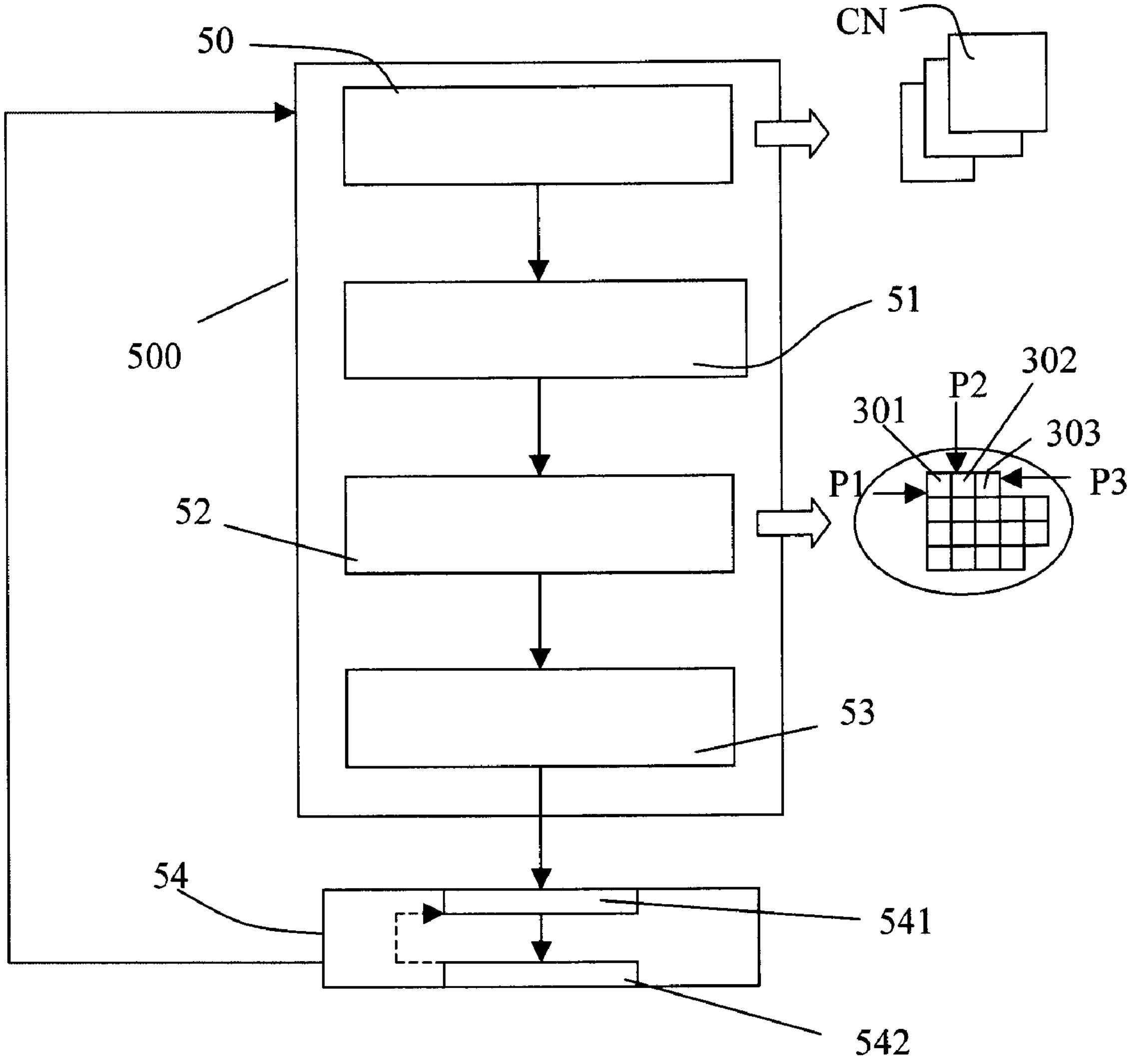
FIG. 4 shows a logic diagram of the steps of the method according to one embodiment of the invention.

With reference to FIG. 4, the method for automatic planning of transmission time delays comprises a step 500 to process data related to the network N, in which the calculation module 11 determines data on the population located in zones Br of disturbing interference, then transmission delays are used to initiate transmission by the radio transmitters 4 at staggered instants during an adjustment step 54. This adjustment step 54 can be followed by reiteration of processing step 500 to re-estimate figures of populations located in zones of disturbing interference. A number of iterations can be parametered for this purpose using configuration means 13 of the system 1. Adjustment step 54 uses values distributed for example at a pitch of between 1 μs and 45 μs over a range of values whose amplitude remains less than 500 μs. The pitch can also be greater than 5 μs to accelerate calculations. To obtain fine optimisation, this step 54 can provide unit modifications of a delay value for a transmitter 4, allowing choice of the modification value which provides the best improvement. Adjustment step 54 also provides for memorization of the delay used for each radio transmitter 4.

In one embodiment of the invention, the adjustment step comprises a step 541 to select a delay adjustment followed by a step 542 to calculate convergence. Convergence calculation step 542 provides for calculation of a criterion representing the total population located in zones Br of disturbing interference. Adjustment step 54 may therefore comprise a plurality of calculations of this criterion and is completed when the number of iterations has been reached. To limit calculation time, it will be understood that the number of iterations to recommence step 541 for selecting a delay adjustment and step 542 to calculate convergence may be higher than the number of iterations planned for recommencing processing step 500.

Adjustment step 54 is finalized on completion of the iterations using the memorized combination of delays used for each transmitter in the set of transmitters 4 enabling a minimum figure to be reached for said estimated figures of populations in zones Br of disturbing interference.

In the non-restrictive example of FIG. 4, the processing step 500 comprises:

- for each radio transmitter 4, a determination step 50 to determine a radio coverage of the network N;
- for each pixel 301, 302, 303 of the network N, an estimation step 51 to estimate different components of the received signal with their respective characteristics of amplitude and time shift;
- for each pixel 301, 302, 303 of the network N, a calculation step 52 to calculate probability of interference P1, P2, P3; and
- a determination step 53 to determine a criterion representing the total population located in zones of disturbing interference.

Step 50 determining radio coverage comprises processing by the calculation module 11 of geographical map data 3 containing the position of the radio transmitters 4, data 31 specifying a transmission level of the transmitters and a sensitivity threshold level of radio reception by terminals of cell 1, and data 32 representing a radio propagation attenuation law, in order to generate data representing coverage maps CN of the network N which, for each of the transmitters 4, specify field levels of signals received in each of the pixels 301, 302, 303. Step 50 to determine radio coverage is followed by step 51 to estimate an effective weight and a interference weight for each of the received signals.

With reference to FIG. 4, a step 52 follows which calculates probability of interference P1, P2, P3 in which a value is calculated by the calculation module 11 representing the signal to disturbance ratio for each pixel 301, 302, 303 on the basis of estimated signals associated with the respective pixels. The probability P1, P2, P3 of interference in the pixel is deduced from the calculations of said ratio in the pixels by the calculation module 11. On the basis of these interference probabilities P1, P2, P3 in each pixel, and of population data corresponding to the divisions of the network N, the following step 53 leads to obtaining a criterion used to evaluate figures of populations ill-served by the network N.

In one embodiment of the invention, it is possible to divide the delay planning process into two parts: a first part used to rapidly obtain a near-optimal solution, and a second part provided to correct residual faults inherent in the first part of the process. With reference to FIG. 8, the inventive method can therefore contain an initialisation step 600 to initialise parameters of the network N, and in particular an initially provided reference instant for the transmission of data frames by the transmitters 4. The process first starts with a step 50' to calculate radio coverage by each transmitter 4 which is similar to step 50 illustrated FIG. 4. Matrices of reception levels in the pixels 301; 302; 303 can thereby be obtained and digital maps CN stored in the memorization means 12.

Figure 5:
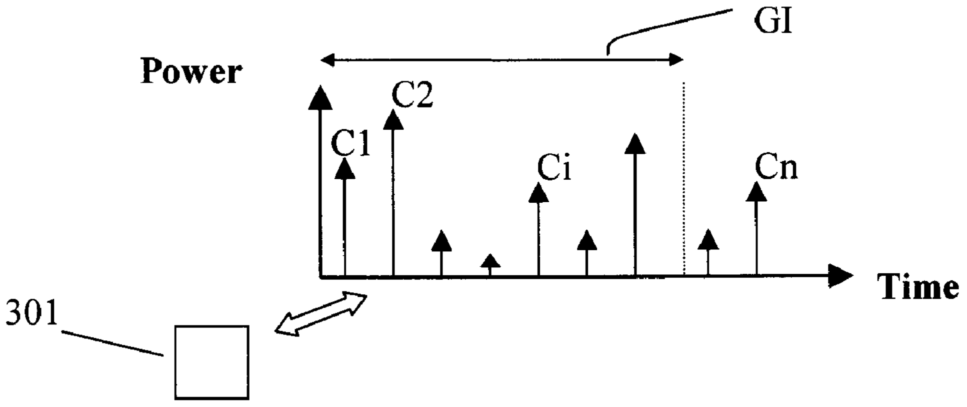
FIG. 5 shows components of signals received in an area of the network corresponding to one pixel.

In the embodiment shown FIG. 8, a step E1 to calculate interference constraints is performed by the calculation module 11. This calculation starts by estimation step 51' to estimate an effective signal and an interference signal in which the received effective power and interfering power are calculated at each dot or pixel 301, 302, 303. FIG. 5 illustrates how to obtain the components C1, C2, . . . Ci, . . . , Cn of the signals. The first part of the planning process can advantageously be used to estimate constraints between each pair of cells solely on the effective surface area which is the zone where either one of the cells, taken within the whole network N, is received with a field at least equal to the minimum C/N ratio associated with the transmission technology and the chosen modulation and coding. These constraints between each pair of cells are calculated for all values of transmission delay differences, thereby forming a single coefficient summarizing interference weights between two cells for a given transmission time difference.

The C/N ratio is for example a ratio corrected by a margin parametered by the user to take into account the specificities of certain network areas (to give consideration to higher quality demand). Therefore on the effective zone a calculation is simply made in each pixel 301, 302, 303 of the effective component and interfering component of each of the two signals received using a weighting function, taking as time origin for example the strongest signal of the two signals.

The system 1 enables specific parametering of weight functions or the use of preprogrammed weight functions for transmission technologies, e.g. T-DAB and DVB-T/H.

When transmissions are made in accordance with the T-DAB standard, the weight coefficient which can be parametered is for example in the form:

$$Wi = -\begin{cases} 0 & \text{if } t \le -Tu \\ (Tu+t)^2/Tu^2 & \text{if } -Tu < t \le 0 \\ 1 & \text{if } 0 < t \le \Delta \\ (Tu+\Delta-t)^2/Tu^2 & \text{if } \Delta < t \le Tu+\Delta \\ 0 & \text{if } t > Tu+\Delta \end{cases}$$

where:

Wi represents the weight coefficient of the i-th signal;

Tu represents the effective period of a symbol;

Δ represents inter-symbol delay; and t represents the instant of arrival of the signal as compared with a reference instant.

When transmissions follow the T-DVB-H standard, the weight coefficient which can be parametered is for example in the form:

$$Wi = -\begin{cases} 0 & \text{if } t \le -Tp \\ (Tu+t)^2/Tu^2 & \text{if } -Tp < t \le 0 \\ 1 & \text{if } 0 < t \le \Delta \\ (Tu+\Delta-t)^2/Tu^2 & \text{if } \Delta < t \le Tp \\ 0 & \text{if } t > Tp \end{cases}$$

where:

Wi represents the weight coefficient of the i-th signal;

Tu represents the effective period of a symbol;

Δ represents the inter-symbol delay;

t represents the instant of arrival of the signal as compared with a reference instant; and Tp represents the interval of effective contribution of the signal.

The breakdown into effective part and interfering part gives consideration to the Wi coefficients. The total power Ct of the effective signal and the total interfering power It are respectively given by the following formulas:

$$Ct = \sum_i WiCi$$

$$It = \sum^i (1 - Wi)Ci$$

With the T-DAB standard, demodulation is differential, whilst with DVB-T/H demodulation is coherent. Reference can be made to the above-cited publication "Impact on coverage of intersymbol interference and FFT window positioning" to find particular additional information on the technologies used for the purpose of estimating the effective component and interfering component of received signals.

It is to be understood that the positioning of the reference time may be made following several possible methods. As non-limitative example, the methods used by the OFDM receivers of mobile terminals to synchronize their demodulation window may be based on:

either alignment on the strongest signal;

or alignment on the first signal above a threshold;

or alignment on the "centre of gravity" (delay weighted by the power of each of the received signals such as illustrated FIG. 5);

or an alignment on the signal component allowing maximisation of the ratio C/I.

The calculation module 11 of the computing system 1 allows a choice to be made from among these four methods, bearing in mind that in practice it is advisable to parameter the method which corresponds to the method mostly implemented in mobile terminals.

Interference probabilities P1, P2, P3 are determined for each pixel 301, 302, 303 during calculation step 52' similar to step 52 previously described. Step 53' then provides the criterion representing the total population located in zones of disturbing interference. In the embodiment shown FIG. 8, the choice of delays parametered during selection step 61 is made by causing the transmission delay to vary between the minimum and maximum limits parametered by the user. Step 62 which follows uses an optimisation algorithm for example of the simulated <<annealing>> type mentioned above to establish a convergence towards a combination [t] of delays that is near-optimal. In this step, for as long as the number of iterations Xi is not reached, delay modifications are proposed, by the delay adjustment means during a reiteration of selection step 61. Adjustment takes into account the cases illustrated FIGS. 6 and 7, for example by preserving some delays allowing a reduction/elimination of zones Br of disturbing interference and the removal of some delays which do not allow such reduction.

The second part of the delay planning process allows for making adjustments, directly on the basis of the near-optimal combination of delays obtained by means of the above-described first part. With reference to FIG. 8, a calculation step E2 to calculate interference maps is made by the calculation module 11 taking into consideration all possible delays. This calculation comprises an extraction step 63 to extract data which can provide firstly data representing interference resulting from programmed delays on each of transmitters 4, taking into account digital maps CN, and secondly population data. On the basis of unit coverage of the cells (matrices of reception levels) and in relation to delays, the calculation module 11 generates data representing a map of interference probability. This interference probability is the probability that the ratio C/(I+N) in a pixel 301, 302, 303 is lower than the minimum functioning level of the network N having regard to field dispersion in the pixel 301, 302, 303.

In one embodiment of the invention, population mapping is then associated with the interference probabilities in each pixel 301, 302, 303 to define precisely the percentage of population disturbed by interference. This percentage can be calculated as follows:

$$\text{Rate\_pop\_interfered} = \frac{\iint_{x,y} \text{pop\_interfered}(x, y) \times \text{population}(x, y)}{\iint_{x,y} \text{population}\,(x, y)}$$

where x and y represent pixel coordinates.

This evaluation function of the population percentage with interference disturbance may be used to qualify potential solutions with respect to each other. Calculation step E2 to calculate interference maps is therefore used to supply reference data to find a solution minimizing the function Rate_pop_interfered as much as possible. With reference to FIG. 8, the process can be continued with a step 641 to adjust delays which takes into account the reference data supplied in the form of interference maps. Step 641 makes it possible to make unit changes to a delay value for a transmitter 4 and to choose the change providing the best gain. The following step 642 uses an optimisation algorithm for example of the simulated <<annealing>> type mentioned above to establish a convergence towards a completely optimal combination [t] of delays. Step 642 is followed by a reiteration of the step calculating interference maps to update the reference data to be used in the following delay adjustment step 641 until a parametered number of iterations is reached. Since each iteration requires complex calculations in each pixel of the network N, on account of the high number of transmission sites and delay values, the number of iterations could be chosen to be fairly low (less than 100 for example).

In one embodiment of the invention, the method illustrated FIG. 8 may use possible reduced delay values, for example by selecting multiple values of ten or twenty microseconds and not the microseconds themselves. Therefore the quality of the result may remain good whilst reducing the calculation time. The increment pitch of possible delay values must nonetheless remain within a low ratio with respect to the guard interval, e.g. at least 5 times less than this guard interval GI.

Evidently, when the values are reduced through use of an increment in the order of tens of microseconds, it may be considered to complete the process illustrated FIG. 8 by at least one complementary iteration cycle in the second part, in order to exploit all possible values.

By way of example, in DVB-T or DVB-H technology, OFDM 8K mode (which corresponds to 6817 sub-carriers) with Quadrature Phase Shift Keying QP5K ¼, the guard interval GI can be taken to be 224 μs. The extent of delay variation can be limited to between 0 and 2 times the duration of this interval GI by user parametering using the configuration means 13. The architecture of the network N is evidently taken into account to parameter the maximum length between transmission shifts or delays. This can represent almost 450 values when the increment between the values is 1 μs. One option provided in the inventive method is to perform a few calculations using values in twenties of microseconds to accelerate convergence. Once convergence is reached, it is possible to change over to a pitch of 5 μs, then 1 μs for fine-tuned optimisation.

As an alternative or complement, the inventive method can use a mesh division of the network N of larger size than pixels (dimensions greater than 1 km*1 km for example). In particular, the division in said meshes can be used to calculate the function Rate_pop_interfered. Hence, whereas coverage calculations are typically made on resolutions of a few dozen meters, and having regard to the fact that the interfering sites are located a few dozen kilometers from each other (the guard interval possibly being sufficiently high to repel interferences well beyond 10 km), the calculations of interferences can be made on the basis of a few $km^2$.

To do so, all that is required is to sub-sample the coverage maps CN of each transmission site with a desired resolution, whilst preserving the minimum power value and the maximum power value of received signals. The minimum value will be used to evaluate the effective field C while the maximum value will be used to evaluate the interferer field. By way of example, the changeover from a resolution of 50 meters (size of a pixel) to a calculation on 2 km makes it possible to accelerate the calculation of an iteration in the second part of the process in a ratio of 1600. Evidently the choice of this calculation resolution is also limited by the duration of the guard interval GI which must remain high compared with the mesh size of the surface area, i.e. a ratio of 10 at least. Here again, it is possible to complete an optimisation made at low resolution with a few iterations in high resolution, the calculation of the evaluation function Rate_pop_interfered being determined with consideration to the elementary pixels 301, 302, 303.

One of the advantages of the invention is to allow a gain in quality of coverage and a gain in engineering time for a radio network N only using one frequency to deliver a digital television broadcasting service to mobile cell terminals.

It will be obvious for those skilled in the art that the present invention allows embodiments in numerous other specific forms without departing from the field of application of the invention as claimed. Therefore, the described embodiments must be considered as illustrations which may be modified in the sphere defined by the scope of the appended claims, and the invention is not to be limited to the details set forth above.

The invention claimed is:

1. Method for automatic planning of transmission time delays of different radio transmitters (4) generating radio cells with one single frequency to form a digital television broadcasting wireless network (N) that is time and frequency synchronous, implemented via a computing system (1) comprising memorization means (12) to store data related to the network (N) including data (3) representing geographical areas divided into a plurality of dots or pixels (301, 302, 303) in accordance with the divisions of said network (N) and containing the position of the radio transmitters (4), population data corresponding to the network divisions, data (31) specifying a transmission level of the transmitters and a sensitivity threshold level of radio reception by terminals of the cell (1), data (32) representing a radio propagation attenuation law and data representing a time period of guard intervals (GI) inserted between data frames, the system (1) also comprising a calculation module (11) and means for parametering a plurality of radio transmitters (4), the method comprising for each radio transmitter (4) an initiation step to initiate a transmission at a determined instant, characterized in that it comprises a processing step (500) to process data related to the network (N) using the calculation module (11) to calculate data representing figures of populations located in zones (Br) of disturbing interference and a step (54) to adjust said initiation step performed for each radio transmitter (4) using a transmission delay varying between 0 and a non-zero value less than 1 ms with memorization for each radio transmitter (4) of the delay used, the adjustment step (54) being follower by a reiteration of processing step (500) to re-estimate figures of populations located in zones of disturbing interference, processing step (500) being reiterated with a number of iterations parametered using the configuration means (13) of the system (1), the adjustment step being finalized after the iterations by using a memorized combination of delays for each transmitter in the set of transmitters (4) allowing a minimum figure to be reached of said estimated populations in zones (Br) of disturbing interference.

2. Method as in claim 1, characterized in that processing step (500) to process data related to the network (N) comprises:

- a determination step (50) to determine radio coverage of the network (N), including processing by the calculation module (11) of geographical map data (3) containing the position of the radio transmitters (4), data (31) specifying a transmission level of the transmitters and a sensitivity threshold level of radio reception by terminals of the cell (1) and data (32) representing a radio propagation attenuation law, to generate data representing coverage maps (CN) of the network (N) which, for each of the transmitters (4), specify field levels of the signals received in each of the pixels (301, 302, 303);
- for each radio transmitter (4), an estimation step (51) to estimate an effective signal and an interference signal in pixels of the network (N), using a breakdown made by the calculation module (11) of field levels of signals received via the network (N) into an effective component and an interfering component, the calculation module (11) using a weighting function which can be parametered to make said breakdown.

3. Method as in claim 2, wherein step (500) to process data related to the network (N), for each radio transmitter (4), comprises:

- a step (52) to calculate an interference probability (P1, P2, P3) for each pixel (301, 302, 303), in which a value representing the signal to disturbance ratio is first calculated by the calculation module (11) for each pixel (301, 302, 303) on the basis of estimated signals associated with the respective pixels, said disturbance consisting of intercellular interference and noise related to the width of the channel used by the transmitters (4) of the cell, then the interference probability (P1, P2, P3) in the pixel is deduced from the calculations of said ratio in the pixels by the calculation module (11); and
- a step (53) to determine a criterion representing a total population located in zones of disturbing interference, said criterion being determined by the calculation module (11) on the basis of interference probabilities (P1, P2, P3) in each pixel and population data corresponding to the divisions of the network.

4. Method as in claim 3, wherein adjustment step (54) to adjust said initiation step is made in a manner determined by the calculation module (11) to reach a minimum sum of said criteria as calculated by integration on all transmitters (4), said minimum resulting in particular from at least one comparison made by comparison means of the calculation module (11) between several separate solutions for adjusting transmission delays within the network (N).

5. Method as in claim 3, wherein the interference probability (P1, P2, P3) in each pixel (301, 302, 303) is deduced from the calculations of said ratio in the pixels of the cell made by comparison means of the calculation module (11), a minimum ratio value being stored in the memorization means (12) and used by the comparison means to determine, for each pixel, whether the minimum ratio is reached and thereby allow the obtaining of interference probability (P1, P2, P3) for the pixel (301, 302, 303).

6. Method as in claim 2, wherein transmissions are made following the T-DAB standard, the weighting coefficient which can be parametered having the form:

$$Wi = -\begin{cases} 0 & \text{if } t \le -Tu \\ (Tu+t)^2/Tu^2 & \text{if } -Tu < t \le 0 \\ 1 & \text{if } 0 < t \le \Delta \\ (Tu+\Delta-t)^2/Tu^2 & \text{if } \Delta < t \le Tu+\Delta \\ 0 & \text{if } t > Tu+\Delta \end{cases}$$

where:

Wi represents the weighting coefficient of the i-th signal;

Tu represents the effective period of a symbol;

Δ represents the intersymbol delay; and t represents the instant of arrival of the signal compared with a reference instant.

7. Method as in claim 2, wherein transmissions are made following the DVB standard, the weighting coefficient which can be parametered having the form:

$$Wi = -\begin{cases} 0 & \text{if } t \le -Tp \\ (Tu+t)^2/Tu^2 & \text{if } -Tp < t \le 0 \\ 1 & \text{if } 0 < t \le \Delta \\ (Tu+\Delta-t)^2/Tu^2 & \text{if } \Delta < t \le Tp \\ 0 & \text{if } t > Tp \end{cases}$$

where:

Wi represents the weighting coefficient of the i-th signal;

Tu represents the effective period of a symbol;

Δ represents the inter-symbol delay;

t represents the instant of arrival of the signal compared with a reference instant; and Tp represents the interval of effective contribution of the signal.

8. Method as in claim 1, wherein adjustment step (54) uses values distributed with a pitch of between 1 µs and 45 µs over a range of values whose amplitude remains less than 500 µs.

9. Method as in claim 1, wherein adjustment step (54) uses values distributed with a pitch of between 5 µs and 45 µs over a range of values whose amplitude remains less than 500 µs.

10. Method as in claim 1, wherein the initiation step to initiate a transmission at a determined instant comprises the splitting of a signal received by the transmitter (4) into a plurality of transmission signals on a plurality of sub-carriers in accordance with digital frequency modulation of OFDM type, guard intervals (GI) having a same determined transmission period being inserted between data frames forming OFDM-modulated symbols (S), the transmission period of the guard intervals (GI) being a constant function of the transmission period of a symbol (S).

11. Method as in claim 1, characterized in that it comprises a memorization step to memorize data on traffic density of users of a mobile telephony network to replace population data.

12. Method as in claim 2, wherein step (50) to determine radio coverage comprises a determination step by the calculation module (11), for each pixel (301, 302, 303), to determine a respective distance between each transmitter (4) and the pixel under consideration, followed by a correction step of this distance by the calculation module (11) taking into account the delay parametered for the respective transmitters (4) by the delay adjustment means.

13. System (1) for automatic planning of transmission time delays of different radio transmitters (4) generating radio cells with one same frequency, to form a digital television broadcasting wireless network (N) that is time and frequency synchronous, comprising memorization means (12) for storing data related to the network (N) including data (3) representing geographical areas divided into a plurality of dots or pixels (301, 302, 303) according to the divisions of said network (N) and containing the position of the radio transmitters (4), population data corresponding to the divisions of the network, data (31) specifying a transmission level of the transmitters and a sensitivity threshold level of radio reception by terminals of the cell (1), data (32) representing a radio propagation attenuation law, and data representing a time period of the guard intervals (GI) inserted between data frames, the system (1) also comprising a calculation module (11) and means for parametering a plurality of radio transmitters (4), characterized in that it comprises initiation means for initiating a transmission at a determined instant for each radio transmitter (4), the calculation module (11) by processing data related to the network (N), being arranged for calculating data representing figures of populations located in zones of disturbing interference, said parametering means being able to use delays which are stored in the memorization means (12), control means and initiation means being provided for delaying transmission at each radio transmitter (4), with a delay varying between 0 and a non-zero value less than 1 ms, said delay being memorized for each radio transmitter (4), the delay adjustment means being linked to the control means to provide different combinations of delays for all the transmitters (4), the calculation module (11) being provided with iteration means allowing re-calculation of figures of populations located in zones of disturbing interference for separate delay combinations, the configuration means (13) of the system (1) being linked to the calculation module (11) to provide a number of iterations allowing the deactivation of the iteration means, said control means being able, from among the combinations provided by the delay adjustment means, to use a combination of delays for all the transmitters (4) which corresponds to the obtaining by the calculation module (11) of a minimum figure for said estimated population figures.

14. System (1) as in claim 13, wherein the calculation module (11), to calculate data representing figures of populations located in zones (Br) of disturbing interference, contains:

means for determining wireless coverage of the network (N), able to process geographical map data (3) containing the position of the radio transmitters (4), data (31) specifying a transmission level of the transmitters and a sensitivity threshold level of radio reception by terminals of the cell (1) and data (32) representing a radio propagation attenuation law, to generate data representing coverage maps (CN) of the network (N) which, for each of the transmitters (4), specifies field levels of signals received in each of the pixels (301, 302, 303);

means for estimating, for each transmitter (4), an effective signal and an interference signal in pixels of the network (N), these estimation means being able to break down field levels of signals received via the network (N) into an effective component and an interferer component, and to use a weighting function parametered using the configuration means (13) to make said breakdown;

means for determining, for each radio transmitter (4), an interference probability (P1, P2, P3) for each pixel (301, 302, 303), arranged to calculate a value representing the signal to disturbance ratio for each pixel (301, 302, 303) on the basis of estimated signals associated with the respective pixels provided by the estimation means, said disturbance consisting of intercellular interference and noise related to the width of the channel used by the transmitters (4) of the cell, said determination means calculating interference probability (P1, P2, P3) in the pixel on the basis of calculations of said ratio in the pixels;

association means allowing, for each transmitter (4), the determination of a criterion representing the total population located in zones (Br) of disturbing interference, said criterion being determined by association of interference probability (P1, P2, P3) in each pixel (301, 302, 303) with population data corresponding to the divisions of the network (N).

15. System (1) as in claim 14, wherein the calculation module (11) determines the combination of delays to be used by the control means via comparison means of the calculation module (11) which, from among a plurality of sums of criteria respectively corresponding to the different combinations of delays, determine a minimum sum of said criteria calculated by integration on all the transmitters (4).

16. System (1) as in claim 14, wherein the interference probability (P1, P2, P3) in each pixel (301, 302, 303) is deduced from the calculations of said ratio in the pixels of the cell by the comparison means of the calculation module (11), a minimum ratio value being stored in the memorization means (12) and used by the comparison means to determine for each pixel whether the minimum ratio is reached and thereby to allow the obtaining of interference probability for the pixel (301, 302, 303).

17. Network for broadcasting wireless communications containing at least one TV or radio program, characterized in that it consists of a mobile telephony network comprising a plurality of transmitter sites forming respective radio cells (20) together defining a radio coverage, and in that all these sites are equipped with transmitters (4) for the broadcasting of TV or radio and in that they are all parametered with one same UHF frequency to generate a radio cell, the transmitters (4) being arranged to send frames forming an OFDM-modulated symbol (S) with a guard interval (GI) corresponding to a fraction of between one quarter and one sixteenth of the transmission period of a frame, the transmitters (4) being arranged to initiate their respective transmission with a determined shift or delay varying between 0 and a non-zero value less than 1 ms and not exceeding twice the period of the guard interval (GI), said network using a combination of delays adapted so as to minimize the number of zones (Br) of disturbing interference coinciding with populated areas.

* * * * *

UNITED STATES PATENT AND TRADEMARK OFFICE

CERTIFICATE OF CORRECTION

PATENT NO. : 7,639,986 B2 Page 1 of 1
APPLICATION NO. : 11/536243
DATED : December 29, 2009
INVENTOR(S) : Francois Vincent It is certified that error appears in the above-identified patent and that said Letters Patent is hereby corrected as shown below:

Column 20, line 38, in Claim 7, delete “if $-Tp < t \leq 0$” and insert -- if $\Delta\ -Tp < t \leq 0$ --, therefor.

Signed and Sealed this

Seventeenth Day of August, 2010

David J. Kappos
*Director of the United States Patent and Trademark Office*